United States Patent [19]
Fukabori et al.

[11] Patent Number: 5,189,255
[45] Date of Patent: Feb. 23, 1993

[54] GAS GENERATOR

[76] Inventors: Mitsuhiko Fukabori, 90-38 Shinzaike, Ibokawacho, Ibo-gun, Hyogo; Hiroshi Iwasaki, 500 Kamiyobe, Yobe-ku, Himeji-shi, Hyogo; Hiroaki Shinto, 40-6 Nishiyamacho 4-Chome, Toyota-shi, Aichi; Yasunori Iwai, 940 Shinzaike, Aboshi-ku, Himeji-shi, Hyogo; Ryuji Nishiuchi, 136 Kamae 5-Chome, Shikama-ku, Himeji-shi, Hyogo; Yuzo Gotoh, 500 Kamiyobe, Yobe-ku, Himeji-shi, Hyogo; Satoru Hiramatsu, 68 Katajima, Ibokawacho, Ibo-gun, Hyogo; Norimasa Hirata, 16-96 Ohtsucho 1-Chome, Ohtsu-ku, Himeji-shi, Hyogo; Masakazu Tokuda, 940 Shinzaike, Aboshi-ku, Himeji-shi, Hyogo, all of Japan

[21] Appl. No.: 576,593

[22] Filed: Aug. 31, 1990

[30] Foreign Application Priority Data

Sep. 4, 1989 [JP] Japan ..................... 1-229073
Sep. 4, 1989 [JP] Japan ..................... 1-229074
Sep. 4, 1989 [JP] Japan ..................... 1-229071
Sep. 4, 1989 [JP] Japan ..................... 1-229072

[51] Int. Cl.$^5$ .................. B60R 21/28; C06D 5/00
[52] U.S. Cl. .................. 102/531; 280/741
[58] Field of Search ............. 102/530, 531; 280/736, 280/740, 741, 742

[56] References Cited

U.S. PATENT DOCUMENTS

| | | | |
|---|---|---|---|
| 3,773,352 | 11/1973 | Radke | 102/531 |
| 3,964,394 | 6/1976 | Wolf | 102/531 |
| 3,985,076 | 10/1976 | Schneiter et al. | 102/531 |
| 4,131,299 | 12/1978 | Ono et al. | 102/531 |
| 4,530,516 | 7/1985 | Adams et al. | 280/741 |
| 4,547,342 | 10/1985 | Adams et al. | 102/531 |
| 4,561,675 | 12/1985 | Adams et al. | 280/734 |
| 4,590,041 | 5/1986 | Hill | 280/741 |
| 4,711,466 | 12/1987 | Breed | 280/741 |
| 4,722,551 | 2/1988 | Adams | 280/736 |
| 4,833,996 | 5/1989 | Hayashi et al. | 102/530 |

Primary Examiner—David H. Brown
Attorney, Agent, or Firm—Weingram & Zall

[57] ABSTRACT

In a mechanical ignition type gas generator including a housing which consists of an upper outer shell container (diffuser) and a lower outer shell container (closure) fitted to each other in such a manner as to define an annular space for storing therein a gas generating agent, a priming charge, a cooling material and a filter, and in which said closure has a cylindrical space capable of fitting to, and storing, a cylindrical mechanical igniter on its lower surface and a plurality of caps ignited by an ignition pin of said igniter are disposed on the top wall of said space, a hole for communicating a priming charge room with the front surface of said caps is disposed inside said closure of said housing besides a cap hole for communicating the back surface of said caps with said priming charge room so as to prevent delayed ignition of said caps.

14 Claims, 3 Drawing Sheets

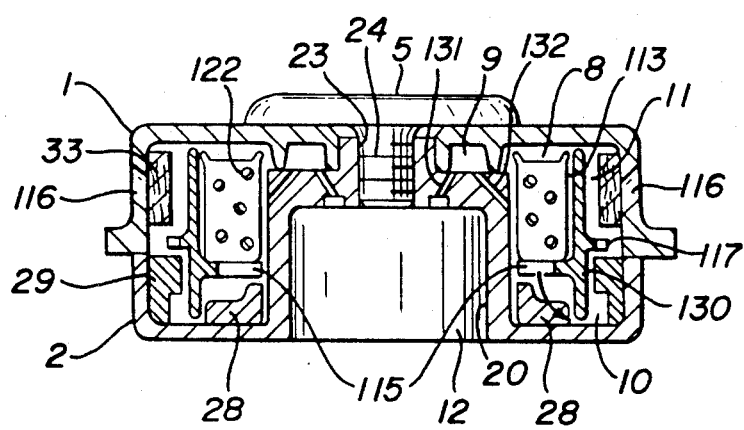
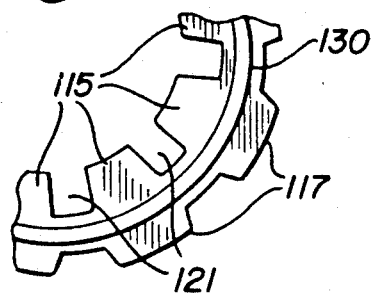
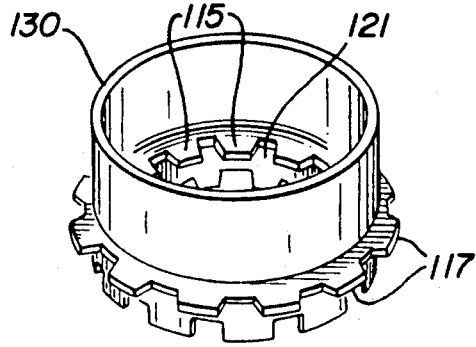
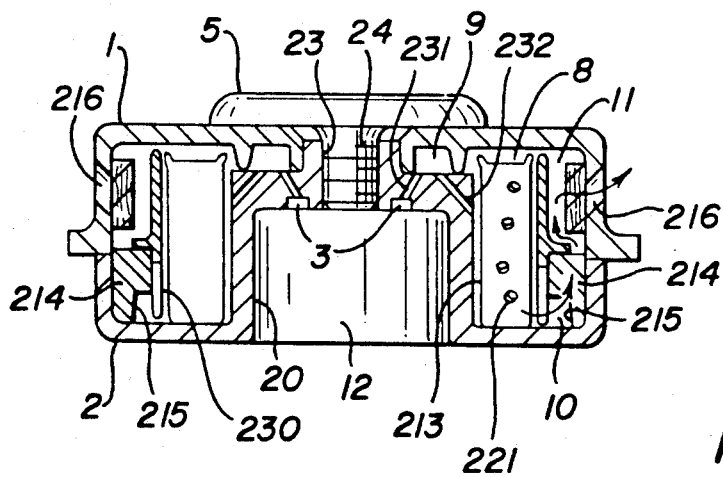
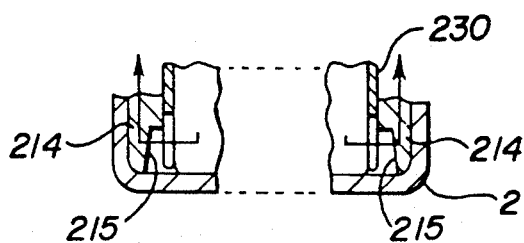

GAS GENERATOR

FIELD OF INDUSTRIAL UTILIZATION

This invention relates to a gas generator used for an air bag for protecting a driver and passengers from impact resulting from collosion accident of a vehicle, and the like. More particularly, the present invention relates to a novel structure of a mechanical ignition type gas generator equipped with a delayed ignition prevention mechanism for caps.

PRIOR ART

As is well known, a gas generator is an important component used for an air bag system of a vehicle and supplies a nitrogen gas into an inflatable bag by burning instantaneously a gas generating agent.

The gas generators can be classified into an electric ignition type and a mechanical ignition type. Whereas the electric ignition type gas generator ignites an igniter (squib) by exothermy of a current, the mechanical ignition type gas generator operates by a pure mechanical sensor and the advantages of the latter reside in that electric wirings or the like are unnecessary and the production cost is low.

An air bag system having such a mechanical ignition type gas generator is proposed by Japanese Patent Laid-Open No. 248454/1985 and is known in the art. This Japanese Patent Laid-Open No. 248454/1985 discloses an air bag system comprising a gas generator for storing a gas generating material, an igniter for igniting the gas generating material and a mechanical sensor installed inside a housing of the gas generator, for sensing collosion and operating the igniter.

A gas generator which stores a gas generating agent, a priming charge, a cooling material, a filter, and the like, in an annular space inside a housing consisting of upper and lower two half-shells is known in the past and these two half-shells are combined with each other by meshing (Japanese Patent Publication No. 22729/1978).

In the conventional mechanical ignition type gas generators, however, a plurality of, or generally two, caps are disposed in order to insure ignition. If only one of the caps operates with the other being inoperative when a sensor senses an accident, the unignited cap ignites in some cases a little belatedly after the air bag is inflated due to the temperature rise of the container as a whole at the time of combustion. There is the possibility that the ignition sound of such delayed ignition of the cap imparts an offensive feel to the passengers.

In addition, an air bag and gas generator are disclosed in U.S. Pat. Nos. 3,985,076, 4,131,299 and 4,296,084.

SUMMARY OF THE INVENTION

As a result of various investigations, the inventors of the present invention have found that delayed ignition can be prevented easily by forming an additional hole on the side of a conventional cap hole so as to transmit energy of a priming charge to the cap from the opposite direction and to ignite the unignited cap without causing time delay. The present invention is thus completed.

In other words, in a mechanical ignition type gas generator including a housing which consists of an upper outer shell container (diffuser) and a lower outer shell container (closure) fitted to each other in such a manner as to define an annular space for storing therein a gas generating agent, a priming charge, a cooling material and a filter and in which the closure has a cylindrical space capable of fitting to, and storing, a cylindrical mechanical igniter on its lower surface and a plurality of caps ignited by an ignition pin of the igniter are disposed on the top wall of the space, the present invention relates to a mechanical ignition type gas generator which is characterized in that a hole for communicating a priming charge room with the front surface of the caps is disposed inside the closure of the housing besides a cap hole for communicating the back surface of the caps with the priming charge room so as to prevent delayed ignition of the caps.

As is well known, the front surface of the cap which is pierced by the ignition pin is composed of an extremely thin aluminum foil but its other surface consists of an aluminum tubular member. When it is ignited by the impact of the ignition pin, the ignition heat of the cap ignites the powder of a priming charge room but when it does not, even if the energy of the priming charge ignited by other caps advances reversely through the cap hole and reaches the aluminum tubular member of the unignited cap, there is the possibility that delayed ignition occurs with a certain time delay due to the temperature rise because of the wall thickness. In the structure of the present invention, however, the energy transmitted in the opposite direction from the priming charge room through the additional hole reaches directly the thin piercing surface of the cap and ignites immediately the unignited cap without any time delay. In this manner the offensive feel of the ignition sound of the cap can be eliminated. When the used gas generator is removed from the vehicle, the removable work can be made reliably in the absence of the unignited cap and safety can thus be improved.

According to the structure of the present invention, if at least one a plurality of caps is ignited, ignition takes place immediately even when any unignited caps exist, and their delayed ignition can be prevented.

The ivention provides the below decribed three improvements (1), (2) and (3).

improvement (1)

As a result of various investigations, the inventors of the present invention have found out that a breakage internal pressure of a gas generating agent container can be regulated without changing the quantity of the gas generating agent by disposing a cylindrical and belt-like reception portion for supporting the gas generating agent container in a pressure partition (combustion ring) inside a housing, forming notches on this reception portion throughout its entire periphery in a circumferential direction and adjusting the open ratio. The present invention is thus completed.

In other words, in a gas generator including a housing consisting of an upper outer shell container (diffuser) and a lower outer shell container (closure) fitted to each other in such a manner as to define an annular space for storing therein a gas generating agent, a priming charge, a cooling material and a filter, the present invention relates to a gas generator which is characterized in that there is disposed an annular pressure partition (combustion ring) for dividing a gas generating agent room, a cooling material room and a filter room, a belt-like gas generating agent container reception portion extending inwardly in a radial direction is disposed on the pressure partition and a large number of notches in a circumferential direction are formed throughout the entire periphery of the reception portion.

According to the structure of the present invention, if the open ratio of the notches of the gas generating agent container reception portion in the circumferential direction is increased, breakage of the gas generating agent container is effected at a low pressure and the outflow of the gas is made at a low temperature. Accordingly, the flow velocity of the gas drops and cooling by the cooling material is made sufficiently. In this manner the discharge pressure of the gas to the outside can be lowered.

improvement (2)

As a result of various investigations, the inventors of the present invention have found that in order to reduce the adhesion quantity of the combustion residue of the gas generating agent to the cooling material and to obtain the sufficient cooling effect, a notch may be disposed at the lower inner part of the cooling material in the radial direction.

In other words, in a gas generator including a housing consisting of an upper outer shell container (diffuser) and a lower outer shell container (closure) fitted to each other in such a manner as to define an annular space for storing therein a gas generating agent, a priming charge, a cooling material and a filter, the present invention relates to a gas generator characterized in that an annular gas cooling material disposed in a cooling material room disposed outwardly in a radial direction of a gas generating agent room has a shape such that its inner lower part is notched in the section in the radial direction.

According to the structure of the present invention, the combustion residue of the gas jetted outwardly in the radial direction from the gas generating chamber adheres to the lower notch portion of the cooling material but since the surface area of the cooling material is made wide by the notch, the adhesion density is lowered and the gas flows smoothly and flows from the center portion to the upper portion, so that the cooling effect can be increased.

improvement (3)

As a result of various investigations, the inventors of the present invention found that if a flexible member (cushion) is disposed on a cover of a container for storing a pellet-like gas generating agent (hereinafter referred to as a "canister") in order to prevent oscillation, breakage of a seal portion due to oscillation of the canister or breakage of the gas generating agent pellet, dimensional accuracy of the total inner height of the housing outer shell container is not required so strictly. The present invention is thus completed.

In other words, in a gas generator including a housing consisting of an upper outer shell container (diffuser) and a lower outer shell container (closure) fitted to each other in such a manner as to define an annular space for storing therein a gas generating agent, a priming charge, a cooling material and a filter, the present invention provides a gas generator which is characterized in that the gas generating agent is stored in a container having a shape fitting to the annular space, the cover of the container is fixed and sealed by caulking the inner and outer cylindrical walls of a container main body, and an annular flexible member is disposed between the cover of gas generating agent container and the opposed surface of diffuser in order to prevent oscillation of the container.

According to the structure of the present invention, the total inner height of the diffuser and closure can be managed easily by merely disposing the flexible member, and the problem of breakage of the gas generating pellet does not occur.

BRIEF DESCRIPTION OF ATTACHED DRAWING

FIG. 1 to 6 show an embodiment of the invention. FIG. 7 to 9 show the improvement (1) of the invention. FIG. 10 and 11 show the improvement (2) FIG. 12 to 15 show the improvement (3).

1 ... diffuser,
2 ... closure,
3 ... cap,
9 ... priming charge room,
18 ... cap hole,
31 ... cap piercing surface,
32 ... delayed ignition prevention hole,
33 ... cap tubular member.

FIG. 7 is a longitudinal sectional view of a gas generator in accordance with the present invention;

FIG. 8 is a partial enlarged plan view of a combustion ring; and

FIG. 9 is a perspective view of the combustion

1 ... diffuser,
2 ... closure,
3 ... cap,
113 ... gas generating agent container,
115 ... gas generating agent container portion,
121 ... notch,
130 ... combustion ring.

FIG. 10 is a longitudinal sectional view of a gas generator in accordance with the present invention; and FIG. 11 is a sectional view of the principal portions of a cooling material inside the gas generator.

1 ... diffuser,
2 ... closure,
10 ... cooling material room,
213 ... gas generating agent room,
214 ... cooling material,
215 ... notch,
222 ... filter,
230 ... combustion ring.

Figure 12:
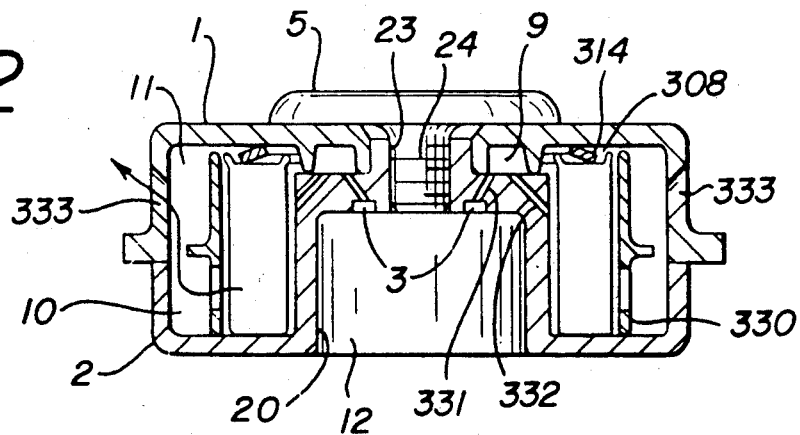
Figure 13:
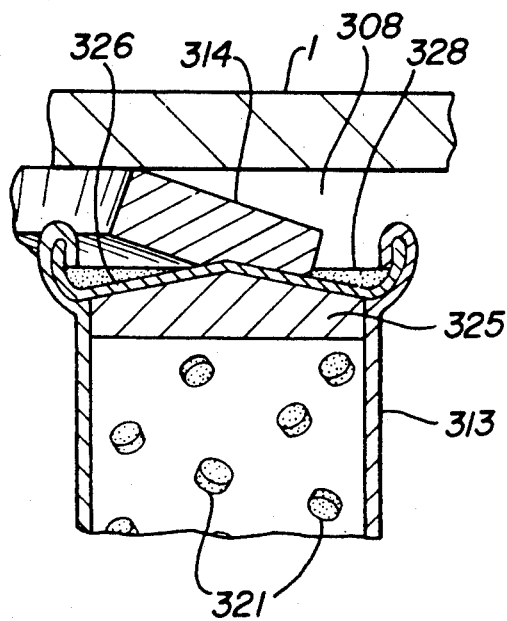
Figure 14:
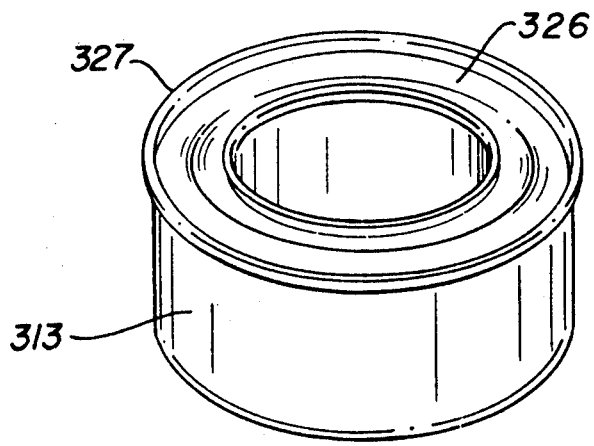

FIG. 12 is a longitudinal sectional view of a gas generator in accordance with the present invention;

FIG. 13 is a sectional view of the principal portions near the upper part of a gas generating agent container;

FIG. 14 is a perspective view of the gas generating agent container; and

Figure 15:
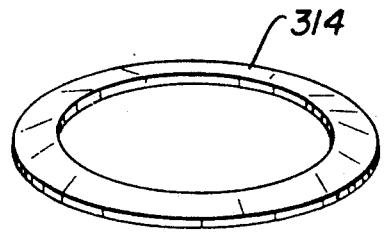

FIG. 15 is a perspective view of a flexible member.

EMBODIMENT

Hereinafter, the present invention will be described with reference to a preferred embodiment thereof shown in the drawings, but the invention is not naturally limited thereto.

Figure 1:
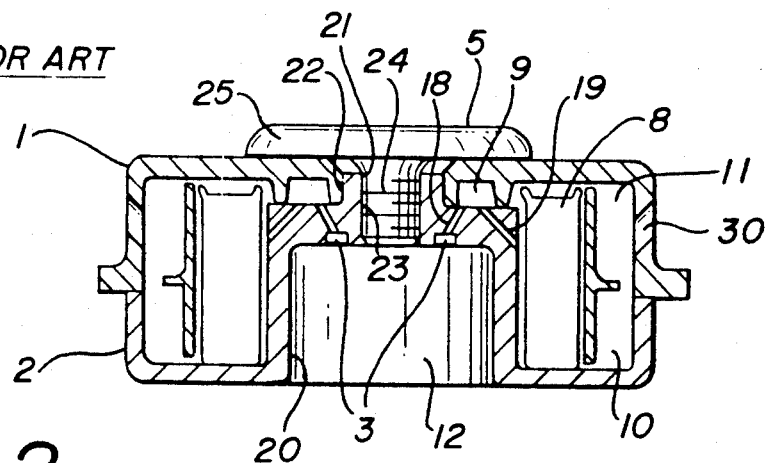
FIG. 1 is a longitudinal sectional view of a gas generator to which the improvement of the present invention is not yet made.

FIG. 1 is a longitudinal sectional view of the principal portions of a gas generator housing to which the improvement by the present invention is not yet made. The housing consists of two half-shells, that is, an upper outer shell container (diffuser) 1 and a lower outer shell container (closure) 2. These two half-shells 1, 2 define therein an annular space consisting of a gas generating agent room 8, a priming charge room 9, a cooling material room 10 and a filter room 11. The closure 2 has a space 20 for storing a mechanical ignition type sensor 12 on its lower surface and is equipped with a pair of caps 3 at its top wall. The diffuser 1 has a center opening 21 and the closure 2 has a center cylindrical portion 22 fitting to this opening. A female screw 23 is formed on the top surface of the center cylindrical portion 22 and a male screw 24 of a reinforcing screw (adaptor) 5 is meshed with it. The lower surface of a sheet-like portion 25 of the reinforcing screw is brought into pressure contact with the upper surface of the diffuser 1 at the time of meshing and this sheet-like portion 25 plays the role of reinforcing the diffuser 1 and the closure 2.

Figure 5:
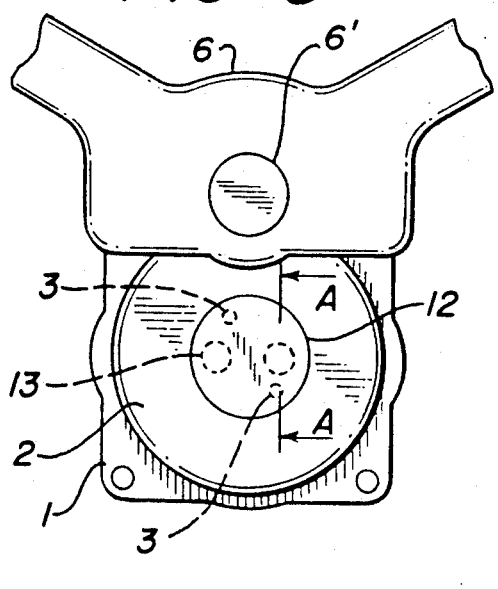
FIG. 5 is a rear view of the gas generator fitted to a steering wheel.
Figure 6:
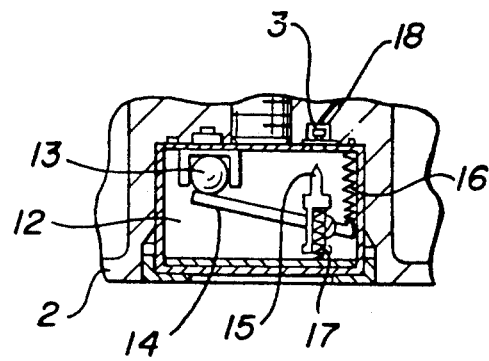
FIG. 6 is a sectional view taken along line A—A of FIG. 5.

FIG. 5 is a rear view when the gas generator fitted to a steering wheel is viewed from a steering shaft. In the drawing, reference numeral 6 represents a steering wheel and 6' is a steering shaft. Reference numerals 1 and 2 represent the upper and lower half-shells of the housing of the gas generator and reference numeral 3 does a pair of caps inside the housing half-shell 2 for storing the sensor 12. Reference numeral 13 represents a pair of sensors (steel balls) inside the sensors and they correspond to the sensors, respectively. FIG. 6 is a sectional view taken along line A—A of the portion of the mechanical ignition type sensor 12 (hereinafter referred to as the "mechanical sensor") of FIG. 5.

As shown in FIG. 6, the mechanical sensor consists of the sensor 13 (steel ball), a lever 14, a firing pin 15 and springs 16, 17.

The sensor 13 is fixed at a certain position by the force of the spring 16 through the lever 14. When a vehicle impinges against any obstacle, a large speed reduction occurs. This speed reduction is transmitted to the sensor 13 through the front portions of the vehicle and through the steering shaft and when its inertia overcomes the spring force of the spring 16 that is set in advance, the sensor 13 starts moving. At this time the hook portion of the lever 14 comes off from the firing pin 15 and blows off (moves) the firing pin 15.

The cap 3 exists in front of the firing pin 15 and is ignited above a certain impact energy. The butt surface (piercing surface) of the priming charge is made of the aluminum foil and the other surfaces are composed of the aluminum tubular member. Ignition occurs when the firing pin 15 pierces the priming charge and the high temperature and high pressure energy reaches the priming charge room (enhancer room) through the passage, that is, the cap hole 18.

The energy of the cap ignites the priming charge and the (high pressure and high temperature) flame generated by the combustion of the priming charge passes through the passage 19 (enhancer passage) and ignites the gas generating agent inside the gas generating room 8.

The resulting gas flows in the radial direction, passes through the cooling material inside the cooling material room 10 and then through the filter room 11, and is emitted into the bag through the discharge port 30.

Figure 2:
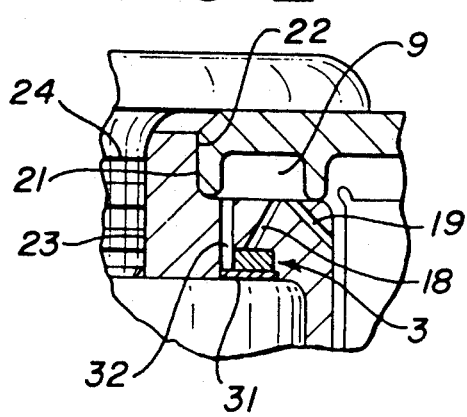
FIG. 2 is a longitudinal sectional view of the principal portions when a delayed ignition prevention mechanism of the present invention is incorporated.
Figure 3:
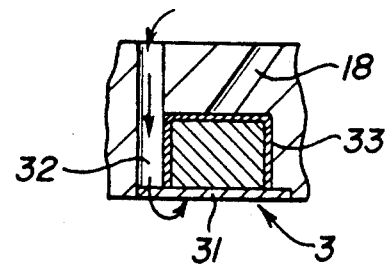
FIG. 3 is its detailed view.
Figure 4:
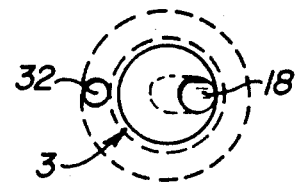
FIG. 4 is a plan view of FIG. 3.

In the present invention, the additional hole for communicating the priming charge room 9 with the piercing surface 31 of the cap 3, or in other words, a delay prevention hole 32, is disposed in addition to the cap hole 18 for communicating the cap 3 with the priming charge room 9, as shown in FIG. 2. As represented by arrow in FIG. 3 showing the further detail, the flame reaches the piercing surface 31 of the cap through the delayed ignition prevention hole 32 and immediately ignites the unignited cap 3.

EMBODIMENT OF IMPROVEMENT 1

FIG. 1 is a longitudinal sectional view of a gas generator housing. The housing consists of two half-shells, that is, an upper outer shell container (diffuser) 1 and a lower outer shell container (closure) 2. These two half-shells 1,2 define therein an annular space consisting of a gas generating agent room 8, a priming charge room 9, a cooling material room 10 and a filter room 11. The closure 2 has a space 20 for storing a mechanical ignition type sensor 12 on its lower surface and is equipped with a pair of caps 3 at its top wall. The diffuser 1 has a center opening and the closure 2 has a center cylindrical portion fitting to this opening. A female screw 23 is formed on the top surface of the center cylindrical portion and a male screw 24 of a reinforcing screw (adaptor) 5 is meshed with it.

The structure of this mechanical ignition type gas generator is such that a mechanical ignition type sensor (mechanical sensor) 12 is incorporated in the gas generator. A known mechanical sensor consisting of a sensor (steel ball), a lever, a firing pin and a spring can be used as the mechanical sensor.

The gas generator having this mechanical sensor 12 is disposed substantially at the center of a steering wheel (handle). When a vehicle impinges against any obstacle, a drastic speed reduction takes place. (This is several times greater than the speed reduction occurring due to panic brake.) This speed reduction operates the mechanical sensor through a wheel front portion and a steering shaft and blows off (moves) the firing pin. A cap 3 is fitted to the tip of the firing pin and this is ignited above a certain impact energy.

When the firing pin pierces the cap 3, ignition takes place and high temperature and high pressure energy reaches a priming charge room (enhancer room) 9 through a passage 131. A ringlike enhancer container is placed inside the priming charge room 9 and the priming charge is sealed into it by an enhancer cover.

Energy of the cap breaks through the enhancer cover and ignites the priming charge. The high pressure and high temperature flame generated by the combustion of the priming charge passes through a passage 132 (an enhancer passage), breaks through the wall of the gas generating agent container 113 storing the gas generating agent and ignites the gas generating agent inside the container.

The pellet-like gas generating agent 122 is packed into the gas generating agent container (canister) 113 placed in the gas generating agent room 8. A pressure partition (combustion ring) 130 is disposed outside the gas generating agent container and has the function of controlling the flowing direction of the combustion gas of the gas generating agent. A round belt-like projection 115 for receiving the canister 113 is disposed on the circumference at the inner lower part of the combustion ring 130. A large number of notches 121 are disposed throughout the entire periphery of this projection 115 as shown in FIG. 8 and the gas generating agent container 113 is disposed on this notched projection (canister reception portion) 115. The notch lower part compresses the cooling material (coolant-in) 28 disposed therebelow and an oscillation-proofing structure is formed by utilizing its flexiblity. A notched projection 117 is disposed outside the combustion ring 130, too, and compresses the second cooling material (coolant-out) 29. This projection plays the role of oscillation-proofing of the cooling material 29 and prevents the upward movement of the cooling material 29 by the pressure at the time of combustion.

The gas resulting from the gas generating agent 121 breaks through the bottom of the gas generating agent container 113 at a certain pressure. In other words, only the bottom surface corresponding to the notches 121 of the inner canister reception portion 115 of the combustion ring 130 is broken and the bottom surface corresponding to the unnotched portions remain. The combustion gas contains also the combustion residue of the gas generating agent and this mixture impinges against the cooling material 28. Thereafter, the gas flows in the radial direction, and enters the second cooling material 29. The residue adheres to the cooling material 28 but almost half of the residue moves to the cooling material 29 with the gas. After passing through the cooling material 29, the gas flows towards the filter 33 which is assembled on the inner diameter side of the discharge port. The gas reaching the filter 33 flows in the radial direction and after the mist is collected, the nitrogen gas is emitted into the air bag through the discharge port.

In the gas generator of the present invention, the pressure regulation of the generated gas can be made easily by the area of the notches 121 to be disposed on the gas generating agent container reception portion 115 of the combustion ring 130.

EMBODIMENT OF IMPROVEMENT 2

FIG. 10 is a longitudinal sectional view of a gas generator housing. The housing consists of two half-shells, that is, an upper outer shell container (diffuser) 1 and a lower outer shell container (closure) 2. These two half-shells 1,2 define therein an annular space consisting of a gas generating agent room 8, a priming charge room 9, a cooling material room 10 and a filter room 11. The closure 2 has a space 20 for storing a mechanical ignition type sensor 12 on its lower surface and is equipped with a pair of caps 3 at its top wall. The diffuser 1 has a center opening and the closure 2 has a center cylindrical portion fitting to this opening. A female screw 23 is formed on the top surface of the center cylindrical portion and a male screw 24 of a reinforcing screw (adaptor) 5 is meshed with it.

This mechanical ignition type gas generator has the construction wherein a mechanical ignition sensor (mechanical sensor) 12 is incorporated in the gas generator. A known mechanical sensor consisting of a sensor (steel ball), a lever, a firing pin and a spring is used as the mechanical sensor.

The gas generator having this mechanical sensor 12 is disposed substantially at the center of a steering wheel (handle). When a vehicle impinges against any obstacle, a drastic speed reduction takes place. This speed reduction operates the mechanical sensor through wheel front portions and a steering shaft and blows off (moves) the firing pin. A cap 3 is fitted to the tip of the firing pin and this is ignited above a certain impact energy.

When the firing pin pierces the cap 3, ignition takes place and high temperature and high pressure energy reaches a priming charge room (enhancer room) 9 through a passage 231. A ring-like enhancer container is placed inside the priming charge room 9 and the priming charge is sealed into it by an enhancer cover.

Energy of the cap breaks through the enhancer cover and ignites the priming charge. The high pressure and high temperature flame generated by the combustion of the priming charge passes through a passage 232 (an enhancer passage), breaks through the wall of the gas generating agent container 213 storing the gas generating agent and ignites the gas generating agent inside the container.

The gas generating agent container placed in the gas generating agent room 8 is made of aluminum and a pellet-like gas generating agent 221 is packed into this container. A pressure partition (combustion ring) 230 is disposed outside the gas generating agent container and has the function of controlling the flowing direction of the combustion gas of the gas generating agent.

The gas resulting from the gas generating agent 221 breaks through the bottom of the gas generating agent container 213 at a certain pressure. Then, the gas flows in the radial direction and enters the cooling material 214 of the cooling material room 10. A notch 215 is formed at the lower part of the cooling material 214 on the inner diameter side and the residue adheres to this surface. Since the surface area of the cooling material 214 is enlarged by this notch 215, the adhesion quantity per unit area can be reduced and the gas flows smoothly. Due to this notch, the gas flows without any resistance to the center portion of the thickness of the cooling material 214 and flows in the axial (longitudinal) direction. Accordingly, the cooling effect can be improved. This flow of the gas is represented by arrow in an enlarged sectional view of the cooling material in FIG. 11.

After passing through the cooling material 214 (with the residue being almost collected already) flows towards the discharge port 216 of the diffuser 1 and a filter 222 is placed into the filter room 11 on the inner diameter side of the discharge port 216.

The gas reaching the filter 222 passes in the radial direction and after the mist is collected, the nitrogen gas is emitted into the air bag through the discharge port 216.

In practicing this embodiment, the shape and size at the inner lower part of the cooling material are not particularly limitative but can be determined suitably by carrying out experiments. Generally, however, the notch has suitably two orthogonal sides or an acute notch having an acute angle by inclining somewhat outwardly the lower side of these two sides as shown in FIG. 11 from the aspect of gas collectibility. The size of the notch is selected in such a manner as to increase as much as possible the inlet area of the gas (which is proportional to the sum of the lengths of the two sides) and to attain a maximum combustion residue quantity.

EMBODIMENT OF IMPROVEMENT 3

FIG. 12 is a longitudinal sectional view of a gas generator housing. The housing consists of two half-shells, that is, an upper outer shell container (diffuser) 1 and a lower outer shell container (closure) 2. These two half-shells 1,2 define therein an annular space consisting of a gas generating agent room 8, a priming charge room 9, a cooling material room 10 and a filter room 11. The closure 2 has a space 20 for storing a mechanical ignition type sensor 12 on its lower surface and is equipped with a pair of caps 3 at its top wall. The diffuser 1 has a center opening and the closure 2 has a center cylindrical portion fitting to this opening. A female screw 23 is formed on the top surface of the center cylindrical portion and a male screw 24 of a reinforcing screw (adaptor) 5 is meshed with it.

A gas generating agent container 313 is disposed in the gas generating agent room 308. FIG. 13 is a partial enlarged view of the container 313. This container is made of aluminum and a pellet-like gas generating agent 321 is packed into the container. A cover 326 is disposed for the gas generating agent container 313 and is fixed by caulking the inner and outer diameters of the container main body. The caulking portion is bonded by an adhesive of resin 328 for moisture-proofing.

In the present invention, a flexible member 314 made of a stainless steel is put on the cover 326. This is disposed in order to prevent oscillation of the gas generating agent container 313 and is supported by the inner surface of the diffuser 1. The stainless steel is molded by winding a spring wire on a core and press-molding it. The flexible member 314 is shaped as an annular member having a suitable thickness and width and comes into flexible contact with the inner surface of the diffuser 1 as shown in FIG. 13. Incidentally, if the gas generating agent is turned into powder form due to breakage of the pellets resulting from vibration, the combustion area and speed change and pressure performance is affected. In order to solve these problems, a flexible member 325 is placed at the upper part inside the container 313, too. A ring-like pressure partition (combustion ring) 330 is disposed outside the gas generating agent container and has the function of controlling the flowing direction of a combustion gas of the gas generating agent 321.

Next, the operation of the gas generator shown in FIG. 12 will be explained briefly. Ignition takes place when the ignition pin of the built-in mechanical ignition sensor 12 pierces the cap 3 and its energy reaches the priming charge room 9 through a passage 331 to ignite the priming charge. The flame of the priming charge flowing through the passage 332 breaks up the inner wall of the gas generating agent container 313 and ignites all at once the gas generating agent 321. The gas generated at this time breaks up the side surface of the gas generating agent container 313 at a certain pressure. The combustion gas contains the combustion residue of the gas generating agent, too, and this mixture impinges against the cooling material inside the cooling material room 10, so that the gas is cooled and the residue adheres to the cooling material.

The gas passing through the cooling material (the combustion residue is almost collected) flows towards the discharge port 333 of the diffuser 1 and the gas reaching the filter inside the filter room 11 on the inner diameter side of the discharge port flows in the radial direction. After the mist is collected, the nitrogen gas is emitted into the bag through the discharge port 333.

We claim:

1. A mechanical ignition gas generator including a housing which consists of an upper outer shell container (diffuser) and a lower outer shell container (closure) fitted to each other in such a manner as to define an annular space for storing therein a gas generating agent, a priming charge room having a priming charge therein, a cooling material and a filter, and in which said closure has a cylindrical space capable of fitting to, and storing, a cylindrical mechanical igniter on its lower surface and a plurality of caps ignited by an ignition pin of said igniter are disposed on the top wall of said space, in which generator a hole for communication said priming charge room with the front surface of said caps is disposed inside said closure of said housing besides a cap hole for communicating the back surface of said caps with said priming charge room so as to prevent delayed ignition of said caps.

2. The generator as claimed in claim 1, in which an annular gas cooling material disposed in a cooling material room disposed outwardly in a radial direction of a gas generating agent room has a shape such that its inner lower part is notched in the section in the radial direction.

3. The generator as claimed in claim 1, in which said gas generating agent is stored in a container having a shape fitting to said annular space, the cover of said container is fixed and sealed by caulking the inner and outer cylindrical walls of a container main body, and an annular flexible member is disposed between said cover of said gas generating agent container and the opposed surface of said diffuser in order to prevent oscillation of said container.

4. The apparatus of claim 1 wherein the diffuser has an upper surface which includes a center opening and the closure has a center cylindrical portion having a top surface, the center cylindrical portion fitting within the center opening, the center cylindrical portion having a female screw formed on the top surface thereof which accepts a male screw of reinforcing screw for reinforcing the diffuser and the closure.

5. The apparatus of claim 4 wherein the reinforcing screw has a lower sheet-like portion which is brought into pressure contact with the upper surface of the diffuser for reinforcing the diffuser and the closure.

6. The generator as claimed in claim 1, in which there is an annular pressure partition (combustion ring) for dividing a gas generating agent room, a cooling material room and a filter room, a belt-like gas generating agent container reception portion extending inwardly in a radial direction is disposed on said pressure partition, and a large number of notches in a circumferential direction are formed throughout the entire periphery of said reception portion.

7. The apparatus of claim 6 further including an enhancer container within the priming charge room for receiving the priming charge.

8. The apparatus of claim 7 wherein the priming charge is sealed within the enhancer container by an enhancer cover and the energy of one of the plurality of caps breaks through the enhancer cover to ignite the priming charge.

9. The apparatus of claim 8 further including a gas generating agent contained in a gas generating agent container (canister), the container disposed in a gas generating agent room, and a pressure partition (combustion ring) for controlling the flowing direction of the combustion gas of the gas generating agent.

10. The apparatus of claim 9 wherein the canister is received by a round belt-like projection disposed on the circumference of the inner lower part of the combustion ring, the projection including a plurality of notches formed on the periphery thereof for compressing a cooling material (coolant-in) disposed therebelow, forming an oscillation-proofing structure.

11. The apparatus of claim 10 further including a notched projection disposed outward of the combustion ring for compressing a second cooling material (coolant-out) for oscillation-proofing the second cooling material and for preventing the second cooling material from being forced upward at the time of combustion.

12. The apparatus of claim 10 wherein the gas generating agent container is made of aluminum.

13. The apparatus of claim 10 wherein the notches each have two orthogonal sides.

14. The apparatus of claim 10 wherein the notches are acute notches having acute angles.

* * * * *